Jan. 9, 1962  F. W. ROSS  3,016,215
AERODYNAMIC AIRCRAFT CONTROL SYSTEM
Original Filed April 14, 1952
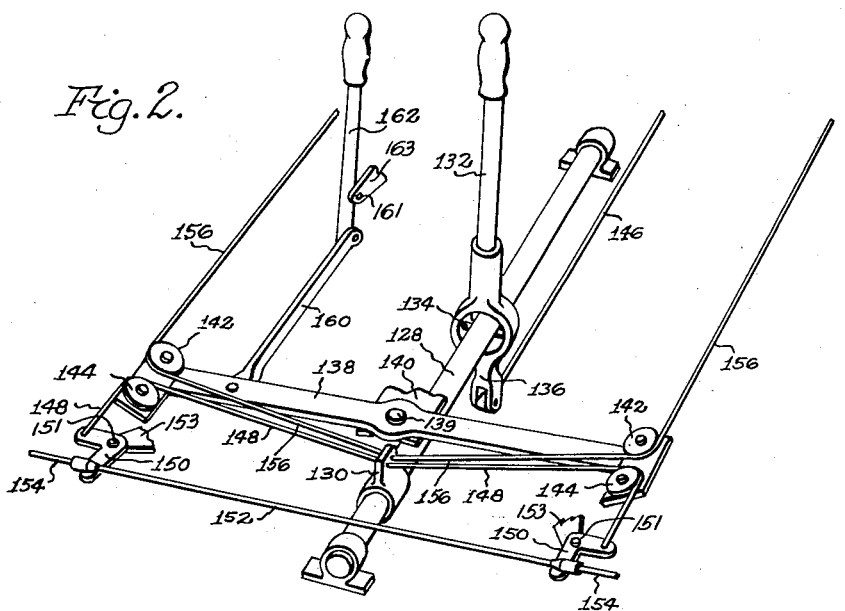
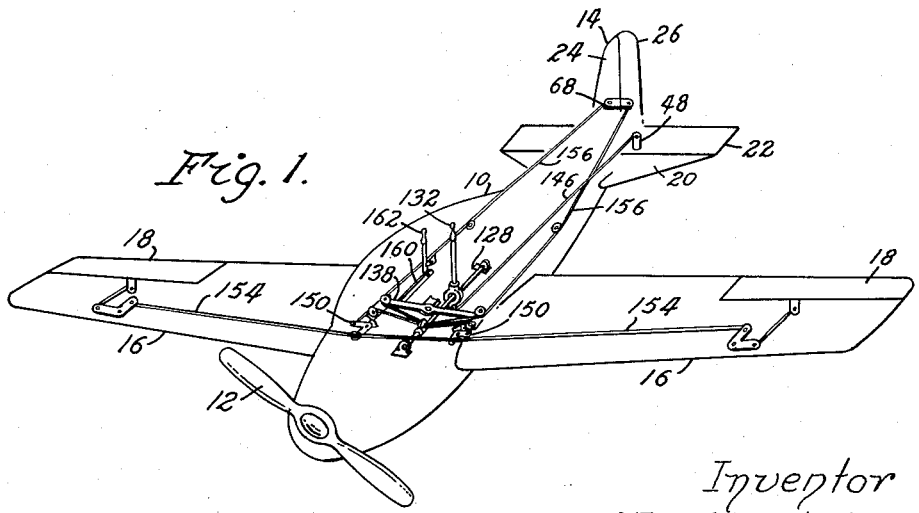
Inventor
Frederick W. Ross
by Barthel + Bugbee
Attys

# United States Patent Office 3,016,215
Patented Jan. 9, 1962

3,016,215
AERODYNAMIC AIRCRAFT CONTROL SYSTEM
Frederick W. Ross, 719 N. Melbourn Ave.,
Dearborn, Mich.
Original application Apr. 14, 1952, Ser. No. 282,110, now Patent No. 2,781,182, dated Feb. 12, 1957. Divided and this application Feb. 11, 1957, Ser. No. 639,443
7 Claims. (Cl. 244—83)

This invention relates to airplanes, and more particularly, to aerodynamic control systems therefor including roll, yaw and pitch controls having improved characteristics which reduce the skill required to pilot an airplane and also which minimize the dangers of piloting an airplane.

All airplanes, in order to be maneuvered while flying and during takeoff and landing, have devices to control the angular position of the airplane with respect to the surrounding air and the ground. Such devices are known collectively in the art as aerodynamic controls, and when used in conjunction with the engine controls, provide means for guiding the airplane through all maneuvers.

The aerodynamic control system constituting the instant invention consists of three principal control elements known by those skilled in the art as a roll control element, such as an aileron, to control the roll angle of the airplane, a yaw control element, such as a rudder, to control the yaw angle of the airplane, and a pitch control element, such as an elevator, to control the pitch angle or angle of attack of the airplane with respect to the oncoming air.

In maneuvering an airplane by the conventional independent aerodynamic controls in conjunction with the engine controls, it is necessary for the pilot to co-ordinate properly the amount of and the time of application of each control during each instant of each maneuver. In particular for co-ordination of the roll control with the yaw control, which is necessary in order to perform a true-banked or properly co-ordinated turn, considerable skill and much practice is required on the part of the pilot, it is difficult to master, and has been a source of danger, the pilot often failing to co-ordinate properly at a time when the dangers of a stall and a spin are imminent.

In addition, for side slipping and for crosswind landings, it is necessary to handle the controls in a manner opposite to that required for the usual co-ordination. It is particularly important that ths cross-control operation be performed with the proper co-ordination because it must be performed at low altitude during landing where a pilot error would be dangerous.

Control systems other than the conventional mechanically independent type have been devised previously in an effort to simplify these control operations. Such systems include (1) some type of coupling between the roll control element and the yaw control element, (2) a roll control element only, without any yaw control element, (3) a coupling between roll and yaw control elements with some kind of overriding system on the rudder control element. All of these previous systems either limit the control operation and hence increase the danger of flying rather than reduce it or involve some other co-ordination to be performed by the pilot which is of about the same or more complexity than for the conventional mechanically independent systems.

The present invention aims to improve the characteristics of aerodynamic control systems so as to reduce the required skill of the pilot, to reduce the time required to teach the pilot, and to reduce the dangers of piloting an airplane.

One object of the invention is to provide an aerodynamic control system having means for automatic co-ordination of roll control with yaw control in combination with an improved independent side slip control.

Another object is to provide an aerodynamic control system which requires simpler operational procedures on the part of the pilot and which has improved performance and safety.

Other objects and advantages of the invention will become apparent during the course of the following description of the accompanying drawing, wherein:

FIGURE 1 is a perspective view of an airplane illustrating the system as installed; and FIGURE 2 is a diagrammatic perspective view of the system.

This application is a division of my co-pending application Serial No. 282,110 filed April 14, 1952 for Aerodynamic Aircraft Control System, which became U.S. Patent 2,781,182 of February 12, 1957.

Referring to the drawings for more specific details of the invention, 10 represents a fuselage having suitable housing facilities for a pilot and passengers, and also suitable housing for a power plant (not shown) for driving a propeller 12. The fuselage also carries conventional empennage 14.

Oppositely-disposed wings 16 of like structure are secured to the fuselage and ailerons 18 are hinged to the trailing edges of the wings, and the wings support a main landing gear (not shown), preferably of the retractable type.

The empennage consists of conventional fixed horizontal surfaces 20 arranged in oppositely disposed relation with corresponding movable elevator surfaces 22 hinged to the trailing edges thereof, and a fixed vertical fin 24 with a movable rudder 26 hinged to the trailing edge of the fin.

FIGURE 3 shows a torque tube or member 128 suitably supported for rotation relatively to the fuselage 10 and having an arm 130 fixedly secured thereto. A control stick or main control lever 132 is pivotally supported on the torque tube 128 as by a pin 134. The stick 132 has a dependent arm 136. The control stick 132 may be swung fore and aft on the pivot pin 134 or moved laterally in either direction so as to rotate the torque tube 128 on its axis.

A cross bar or member 138, pivoted at 139 on a support 140 fixed on the main frame of the fuselage 10, rotatably supports two pairs of rotary sheaves 142 and 144 arranged in spaced relation to one another and to the axis of the pivot 139 of the cross bar 138. The dependant arm 136 of the control stick 132 is connected by a push-pull rod 146 to the horn 148 fixedly secured to the elevator 22 (FIGURE 1) so that fore and aft movements of the control stick 132 will deflect the elevator 22.

The arm 130 on the torque tube 128 is connected by corresponding cables 148 mounted for travel on the sheaves 144 supported on the cross bar 138 to one arm each of bell crank levers 150 which are pivotally mounted as at 151 on brackets 153 fixedly secured to the fuselage frame. A cable 152 interconnects the other arms of the bell-crank levers 150, which in turn are connected by push-pull rods 154 and 62 and the bell cranks 60 to the aileron horns 64 fixedly secured to the ailerons 18.

The arm 130 on the torque tube 128 is also connected by corresponding cables 156 mounted for travel on the sheaves 142 supported on the cross bar 138 to the horn 68 fixedly secured to the rudder 26 (FIGURE 1). A push-pull rod 160 pivotally connects the cross bar 138 to an auxiliary control lever 162 which is pivotally mounted at 161 on the bracket 163 secured to the fuselage frame.

In the operation of the control system of the present invention, lateral motion of the control stick 132, say to starboard, through the connections to the arm 130 and because of the control surface hinge friction and the airloads on the ailerons and rudders, introduces a tension on the port side, in cables 148 and 156 respectively. These two tensions through the arrangements of the sheaves 142 and 144 on the cross bar 138 each introduce moments tending to rotate the cross bar 138. Through the arrangement as shown, however, these moments tend to counteract each other. Hence, as described hereinbefore, the operation of the auxiliary control lever 162 and of the control stick 132 can be made completely independent of one another with a minimum of friction or spring tension.

The aerodynamic control system of this invention makes it possible to operate the aerodynamic roll and yaw control elements in unison for making co-ordinated turns merely by shifting the main control lever or stick 132, and to operate the same aerodynamic roll and yaw control elements in unison properly for making side slips by merely shifting the auxiliary control lever 162, the two operations being independent of each other and requiring no close co-ordination. This aerodynamic control system, therefore, has the advantages of simplicity and safety, of what is termed a "two-control" system by those skilled in the art, in addition to having the advantage of making it possible to perform such maneuvers as side slip and cross wind landings more precisely and with less skill required by the pilot than for previously known systems.

The inclusion of a differential mechanism or means in the means connecting the roll control element to the control lever as well as a second differential mechanism or means in the rudder linkage is believed to be new and novel. When incorporated into a rudder-aileron coupled control system as herein described, it is possible for the pilot to side slip the airplane by merely shifting the auxiliary control lever 162, there being no necessity for him to compensate any roll action as by the control stick 132 such as will be introduced as by a system incorporating only a single differential mechanism on the rudder linkage only.

In addition to this simplicity, another advantage of the system described is that the mechanism for overriding the aileron coupling is arranged to react with the mechanism for overriding the rudder coupling so that operation of the coupled aileron-rudder system as for making a turn by application of the control stick or main control lever 132 or as for side slipping by application of the auxiliary control lever 162 requires no reactive force by the pilot on either control. The advantage of complete independence, as obtained by the system described, of these control operations is readily recognized when considered in view of the complexities of piloting an airplane. Furthermore, these extreme simplifications of the control operations are obtained without restriction of control deflections in any way.

The inclusion of a means for compensating the roll due to side slip which is caused by operation of an overriding auxiliary yaw control included in conjunction with a control system having the roll and yaw controls operable from a single primary control lever, and for providing the necessary bank for side slip is believed to be novel.

Differential overriding devices incorporating friction, springs or elastic to provide the reaction necessary to separate the double control actions needed may be substituted for the mechanisms described.

Further advantages and improved control and performance may be obtained by utilizing in conjunction with the present invention a mechanism incorporating in the linkage which connects the control stick to the rudder and ailerons for the operation of performing a banked-turn, a variable ratio of rudder control to aileron control (rather than an essentially constant ratio as herein described) wherein the variable ratio is adjusted by the pitch control setting.

It will be evident that it is optional with the designer whether the control system of the present invention employs foot pedals as in the parent Patent No. 2,781,182 hereof to shift the cross bar 138 in association with a control stick as in FIGURES 1 and 2, an auxiliary hand lever, such as the hand lever 162, or a hand wheel, or whether it employs motion-transmitting cables as in FIGURES 1 and 2 or motion-transmitting rods.

What I claim is:
1. In an aircraft having a frame and equipped with an aerodynamic yaw element and a pair of spaced oppositely-movable roll elements, an aerodynamic control system comprising a primary control member, a secondary control member, a first elongated flexible motion-transmitting element operatively connected to said yaw element, a second elongated flexible motion-transmitting element operatively connected to said roll elements, means connecting said flexible motion-transmitting elements to said primary control member for simultaneously pulling said flexible motion-transmitting elements in response to shifting said primary control member, and mechanism simultaneously engaging said flexible motion-transmitting elements and connected to said secondary control member for pulling one of said flexible motion-transmitting elements in one direction while pulling the other of said flexible motion-transmitting elements in the opposite direction in response to shifting said secondary control member.

2. An aerodynamic aircraft control system according to claim 1, wherein said means includes a connecting device operatively connecting said flexible motion-transmitting elements to said primary control member for pulling said flexible motion-transmitting elements simultaneously in the same direction in response to shifting said primary control member.

3. An aerodynamic aircraft control system according to claim 1, wherein said means includes a rotatable member rotated in response to shifting said primary control member and an anchorage securing said flexible motion-transmitting elements to said rotatable member.

4. An aerodynamic aircraft control system according to claim 3, wherein said anchorage includes a structure projecting transversely from said rotatable member and having said flexible motion-transmitting elements connected thereto at a location spaced transversely away from the axis of rotation of said rotatable member.

5. An aerodynamic aircraft control system according to claim 1, wherein said mechanism includes a swingable pivoted member having flexible motion-transmitting element pulling devices mounted thereon in spaced relationship to the pivot thereof and in pulling engagement with said flexible motion-transmitting elements in response to swinging of said pivoted member.

6. An aerodynamic aircraft control system according to claim 5, wherein said swingable pivoted member includes a centrally-pivoted cross bar and wherein said pulling devices comprise sheaves rotatably mounted on said cross bar outwardly from its pivot on opposite sides thereof.

7. An aerodynamic aircraft control system according to claim 5, wherein said swingable pivoted member includes a centrally-pivoted cross bar, wherein said pulling devices comprise a pair of sheaves mounted adjacent each end of said cross bar and wherein one sheave of each pair rotatedly engages one flexible motion-transmitting element and the other sheave of each pair rotatedly engages the other flexible motion-transmitting element.

References Cited in the file of this patent
UNITED STATES PATENTS

| | | |
|---|---|---|
| 2,542,946 | Ross | Feb. 20, 1951 |
| 2,781,182 | Ross | Feb. 12, 1957 |